United States Patent
Sekine et al.

(10) Patent No.: US 10,744,988 B2
(45) Date of Patent: Aug. 18, 2020

(54) RESERVOIR TANK

(71) Applicants: ADVICS CO., LTD., Kariya-shi, Aichi-ken (JP); TOYOTA JIDOSHA KABUSHIKI KAISHA, Toyota-shi, Aichi-ken (JP)

(72) Inventors: Yusuke Sekine, Takahama (JP); Ryosuke Sakakibara, Chiryu (JP); Jun Matsushima, Obu (JP); Akira Omizu, Nagoya (JP); Koji Masuda, Miyoshi (JP); Akira Sakai, Toyota (JP); Hideki Sugawa, Toyota (JP)

(73) Assignees: ADVICS CO., LTD., Kariya-Shi, Aichi-Ken (JP); TOYOTA JIDOSHA KABUSHIKI KAISHA, Toyota-Shi, Aichi-Ken (JP)

( * ) Notice: Subject to any disclaimer, the term of this patent is extended or adjusted under 35 U.S.C. 154(b) by 52 days.

(21) Appl. No.: 16/135,527

(22) Filed: Sep. 19, 2018

(65) Prior Publication Data

US 2019/0084541 A1    Mar. 21, 2019

(30) Foreign Application Priority Data

Sep. 21, 2017  (JP) .................................. 2017-181564

(51) Int. Cl.
*B60T 11/26* (2006.01)
*B60T 11/22* (2006.01)
(Continued)

(52) U.S. Cl.
CPC ............ *B60T 11/26* (2013.01); *B60K 15/077* (2013.01); *B60T 11/22* (2013.01); *B60T 17/06* (2013.01);
(Continued)

(58) Field of Classification Search
CPC ........ B60T 11/22; B60T 11/26; B60T 11/228; B60T 17/06
See application file for complete search history.

(56) References Cited

U.S. PATENT DOCUMENTS 3,914,943 A * 10/1975 Lewis ..................... B60T 11/22
60/585
4,026,319 A     5/1977 Pickering
(Continued)

FOREIGN PATENT DOCUMENTS

FR    2 969 563 A1    6/2012
GB    2 111 621 A     7/1983
(Continued)

OTHER PUBLICATIONS

Office Action (Notice of Reasons for Refusal) dated Aug. 6, 2019, by the Japanese Patent Office in corresponding Japanese Patent Application No. 2017-181564 and an English Translation of the Office Action. (9 pages).
(Continued)

*Primary Examiner* — Michael Leslie
*Assistant Examiner* — Matthew Wiblin
(74) *Attorney, Agent, or Firm* — Buchanan Ingersoll & Rooney PC

(57) ABSTRACT

The reservoir tank includes a reservoir body which reserves a fluid in an inner portion thereof formed to be in a hollow box shape. The reservoir body includes a port extending outward, a reservoir chamber which reserves the fluid and a port chamber which volume is smaller than that of the reservoir chamber and is in fluid communication with the port and a first communication passage positioned at a portion lower than a changeable liquid surface of the fluid reserved in the reservoir chamber in a vertical direction and provided at the first partition portion to allow the fluid communication between the reservoir chamber and the port
(Continued)

chamber and wherein the port chamber and the port are kept being a state in which they are filled with the fluid supplied from the reservoir chamber via the first communication passage.

6 Claims, 5 Drawing Sheets

(51) Int. Cl.
  *B60T 17/06* (2006.01)
  *B60T 17/22* (2006.01)
  *B60K 15/077* (2006.01)
  *B60K 15/03* (2006.01)

(52) U.S. Cl.
  CPC ...... *B60T 17/225* (2013.01); *B60K 15/03177* (2013.01); *B60K 2015/0344* (2013.01); *B60K 2015/0777* (2013.01); *B60Y 2400/81* (2013.01)

(56) References Cited

U.S. PATENT DOCUMENTS

| | | | |
|---|---|---|---|
| 4,514,980 A | * | 5/1985 | Ishiwata ............... B60T 17/225 60/534 |
| 2011/0265469 A1 | * | 11/2011 | Mouri ..................... B60T 11/26 60/592 |
| 2013/0048643 A1 | * | 2/2013 | Flajnik ............. B60K 15/03177 220/562 |
| 2019/0152646 A1 | * | 5/2019 | Allan ..................... B60K 11/02 |

FOREIGN PATENT DOCUMENTS

| | | |
|---|---|---|
| JP | H01-085501 U | 6/1989 |
| JP | H02-008511 U | 1/1990 |
| JP | 2017114502 A | 6/2017 |
| WO | 2011/072386 A1 | 6/2011 |

OTHER PUBLICATIONS

The extended European Search Report dated Feb. 27, 2019, by the European Patent Office in corresponding European Patent Application No. 18193106.4-1012. (9 pages).

* cited by examiner

RESERVOIR TANK

This application claims priority under 35 U.S.C. 119 with respect to Japanese Application No. 2017-0181564 filed in Japan on Sep. 21, 2017, the entire content of which is herein incorporated by reference.

FIELD OF INVENTION

This invention relates to a reservoir tank for reserving an operating liquid.

BACKGROUND OF INVENTION

Conventionally, a reservoir tank, for example, disclosed in the Patent Literature 1, as listed below, has been known. According to the conventional reservoir tank, the discharge port and the return port are provided at a portion relatively closer to the bottom surface of the tank so that the discharge port and the return port position at a portion lower than the oil liquid surface under a normal state. This can prevent the ports from exposing to the air which exists above the oil liquid surface. Further, according to the conventional reservoir tank, a partition plate is provided for guiding air bubbles included in the oil upwardly. Thus, an air suctioning from the discharge port due to the existence of the air bubbles in the oil can be prevented.

RELATED ART

Patent Literature 1: JP2017-114502 A

DISCUSSION OF RELATED ART

If the air bubbles enter the discharge port and the return port (tubular projecting portion), an electromagnetic valve or the like to which the pressurized oil (operating liquid) is supplied from a master cylinder or a pump, etc., (vehicle mounted apparatus) installed in a vehicle may result in an operation malfunction. In order to prevent such malfunction, the discharge port and the return port according to the conventional structure are provided at a bottom portion side of the reservoir tank so that these ports are positioned at a portion lower than the liquid surface of the operating liquid reserved therein.

However, there may be some cases in which the arrangement of the discharge port and the return port is decided depending on the installability of reservoir tank to the vehicle and the arrangement of the vehicle mounted apparatus to which the operating liquid is supplied from the reservoir tank. In such case, according to the conventional reservoir tank explained above, when the discharge port and the return port are arranged at an upper side from the bottom portion side of the tank, i.e., arranged at a portion approaching the liquid surface of the operating liquid, for example, if the air bubbles are generated in the operating liquid due to the liquid surface change caused by the vehicle braking operation or the vehicle turning operation, the air existing in the tank above the liquid surface enters the discharge port and the return port or the bubbles (air bubbles) generated in the operating liquid may enter the discharge port and the return port.

The present invention was made in consideration of the above issues and problems of the known arts and it is an object of the invention to propose a reservoir tank which can suppress the air bubbles flowing into the tubular projecting portion, regardless of the position of such projecting portion which is to be connected to the vehicle mounted apparatus.

SUMMARY OF INVENTION

One of the aspect of the invention to solve the above problems is characterized in that the reservoir tank includes a reservoir body which reserves an operating liquid in an inner portion thereof formed to be in a hollow box shape and that the reservoir tank is connected to a vehicle mounted apparatus for a fluid communication of the operating liquid with the vehicle mounted apparatus, wherein the reservoir body includes a tubular projecting portion extending outward from an outer wall portion, a first partition portion which divides the inner portion of the reservoir body into a first chamber which reserves the operating liquid therein and a second chamber which volume is smaller than the volume of the first chamber and being in communication with the tubular projecting portion and a first communication passage positioned at a portion lower than a vertically changeable liquid surface of the operating liquid reserved in the first chamber in a vertical direction and provided at the first partition portion to allow a communication between the first chamber and the second chamber and wherein the second chamber and the tubular projecting portion are kept being a state in which the first chamber and the second chamber are filled with the operating liquid which is supplied from the first chamber via the first communication passage.

According to the aspect of the invention, the inner portion of the reservoir body is defined into the first chamber and the second chamber, the volume of which is smaller than that of the first chamber and further, the second chamber is kept being a state in which the second chamber is filled with the operating liquid which is supplied via the first communication passage which is positioned at a portion lower than the liquid surface of the operating liquid reserved in the first chamber in a vertical direction. Therefore, even the movement of the liquid surface of the operating liquid in the first chamber is generated which may sequentially generate the movement of the liquid surface of the operating liquid in the second chamber, such generation of the movement of the liquid surface of the operating liquid in the second chamber can be suppressed. This is because the volume of the second chamber is smaller than the volume of the first chamber and further the second chamber is filled with the operating liquid. As a result, the generation of air bubbles in the operating liquid in the second chamber caused by the generation of the liquid surface movement of the operating liquid of the operating liquid in the second chamber ca be suppressed. Further, even the air bubblers are generated in the operating liquid in the first chamber due to the liquid surface movement, such generated air bubbles are moved upward in a vertical direction and accordingly, the entering of such air bubbles in the second chamber via the first communication passage which is positioned at a lower side in the vertical direction can be prevented. Accordingly, the communication between the projecting portion and the second chamber can suppress the air bubbles from entering the projecting portion, regardless of the position of the projecting portion.

BRIEF EXPLANATION OF ATTACHED DRAWINGS

The foregoing and other objects and many of the attendant advantages of the present invention may readily be appreciated as the same becomes better understood by reference to the preferred embodiments of the present invention when considered in connection with the accompanying drawings, wherein like reference numerals designate the same or corresponding parts throughout several views, and in which.

THE EMBODIMENTS FOR IMPLEMENTING THE INVENTION

The embodiment of the invention will be explained hereinafter with reference to the attached drawings. It is noted here that the portions or the components which are same or equivalent to those in the embodiments or the modified embodiments are designated as the same numerals. It is also noted that the attached drawings illustrate the conceptual structures for the purpose of explanation and the shape or size of each component or the portion does not strictly illustrate the actual shape or size in practical use.

Figure 1:
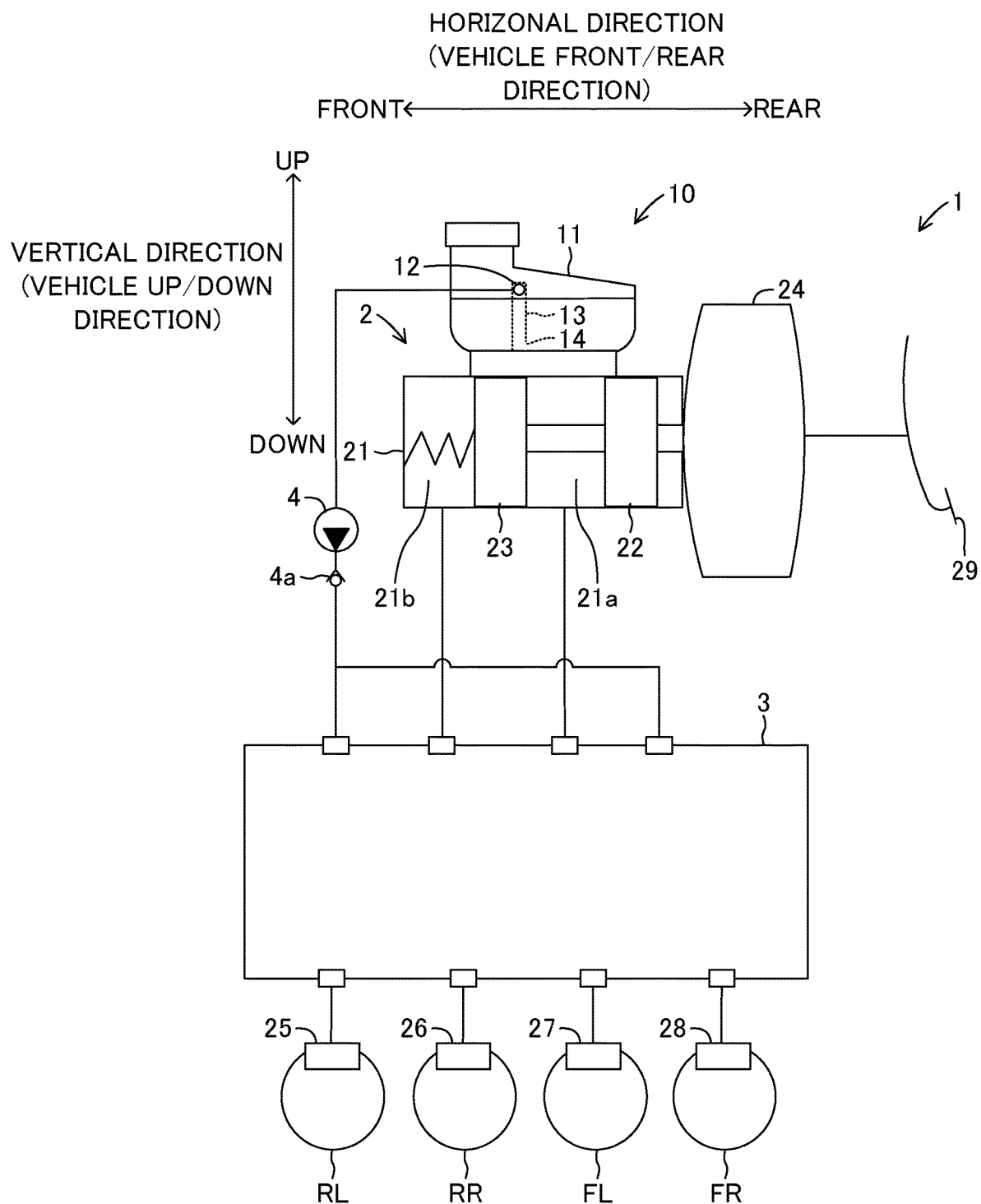
FIG. 1 is a view of the brake device in which the reservoir tank according to an embodiment of the invention is installed.

The reservoir tank 10 according to the embodiment illustrated in FIG. 1 forms a portion of a vehicle brake device 1. The vehicle brake device 1 includes a cylinder mechanism 2. The cylinder mechanism 2 includes a brake master cylinder 21 as a vehicle mounted apparatus (hereinafter also referred to merely as "master cylinder 21") and master pistons 22, 23 and a brake booster 24. The master pistons 22, 23 are disposed in the master cylinder 21 and slidable therein. The master pistons 22, 23 divide the inner space of the master cylinder 21 into a first master chamber 21a and a second master chamber 21b. The brake booster 24 is, for example, a vacuum type boosting device which boosts the depression force of the driver of the vehicle on a brake pedal and transmits the boosted depression force to the master pistons 22, 23.

Further, the cylinder mechanism 2 includes a wheel cylinder 25, a wheel cylinder 26, a wheel cylinder 27 and a wheel cylinder 28. Each wheel cylinder 25 through 28 is connected to the master cylinder 21 and a pump 4, as a vehicle mounted apparatus, via a brake actuator 3 (hereinafter, referred to simply as "actuator 3"). The wheel cylinder 25 is provided at the rear-left wheel RL of the vehicle. The wheel cylinder 26 is provided at the rear-right wheel RR of the vehicle. The wheel cylinder 27 is provided at the front-left wheel FL of the vehicle. The wheel cylinder 28 is provided at the front-right wheel FR of the vehicle. Under such structure, when the brake fluid (operating liquid) pressurized by the master cylinder 21 or the pump 4 is supplied to the wheel cylinders 25 through 28 via the actuator 3, the braking force is applied to the rear-left wheel RL, the rear-right wheel RR, the front-left wheel FL and the front-right wheel FR to apply brake to the vehicle.

The detail structure of the actuator 3 is omitted. The actuator 3 is provided with a conduit passage, an electromagnetic valve and a check valve corresponding respective wheel cylinders 25 through 28. According to this structure, when the electromagnetic valve is controlled by the control device (microprocessor) (not shown) to be switched to a fluid communication state or a fluid interrupted state, the fluid pressurized by the master cylinder 21 is supplied to the respective wheel cylinders 25 through 28 or the fluid pressurized by the pump 4 is supplied to the respective wheel cylinders 25 through 28. It is noted that the detail operation of the actuator 3 will not be explained here, since such operation of the actuator 3 does not directly relate to the subject of the invention.

The pump 4 pressurizes the fluid supplied from the reservoir tank 10 and supplies the actuator 3 with the pressurized fluid via the check valve 4a. The check valve 4a allows the fluid flowing from the pump 4 to the actuator 3 but prohibits the fluid flowing from the actuator 3 to the pump 4 (i.e., reservoir tank 10).

In the vehicle brake device 1, when the driver of the vehicle depresses the brake pedal 29, the depression force is boosted by the brake booster 24 which is liquid-tightly connected to the master cylinder 21 and the boosted depression force pushes the master pistons 22, 23 provided in the master cylinder 21. As will be described later, the reservoir tank 10 in which the fluid is reserved is communicably connected with the first master chamber 21a and the second master chamber 21b of the master cylinder 21. Thus, the fluid in the first and the second master chambers 21a and 21b supplied from the reservoir tank 10 is pressurized to generate a master cylinder pressure in the first and the second master chambers 21a and 21b. Thus, generated master cylinder pressure is supplied to (transmitted to) respective wheel cylinders 25 through 28.

Further, in the vehicle brake device 1, for example, the pump 4 is actuated to correct the vehicle behavior under a vehicle running or under a braking operation. The pump 4 is connected to a tubular projecting portion which serves as a port 12 of the reservoir tank 10. Therefore, the pump 4 suctions the fluid from the reservoir tank 10 (in more concretely, a port chamber R2 serving as a second chamber, which will be explained later) and pressurizes the suctioned fluid to generate a pump pressure. Thus, generated pump pressure is supplied to (transmitted to) the respective wheel cylinders 25 through 28.

Figure 2:
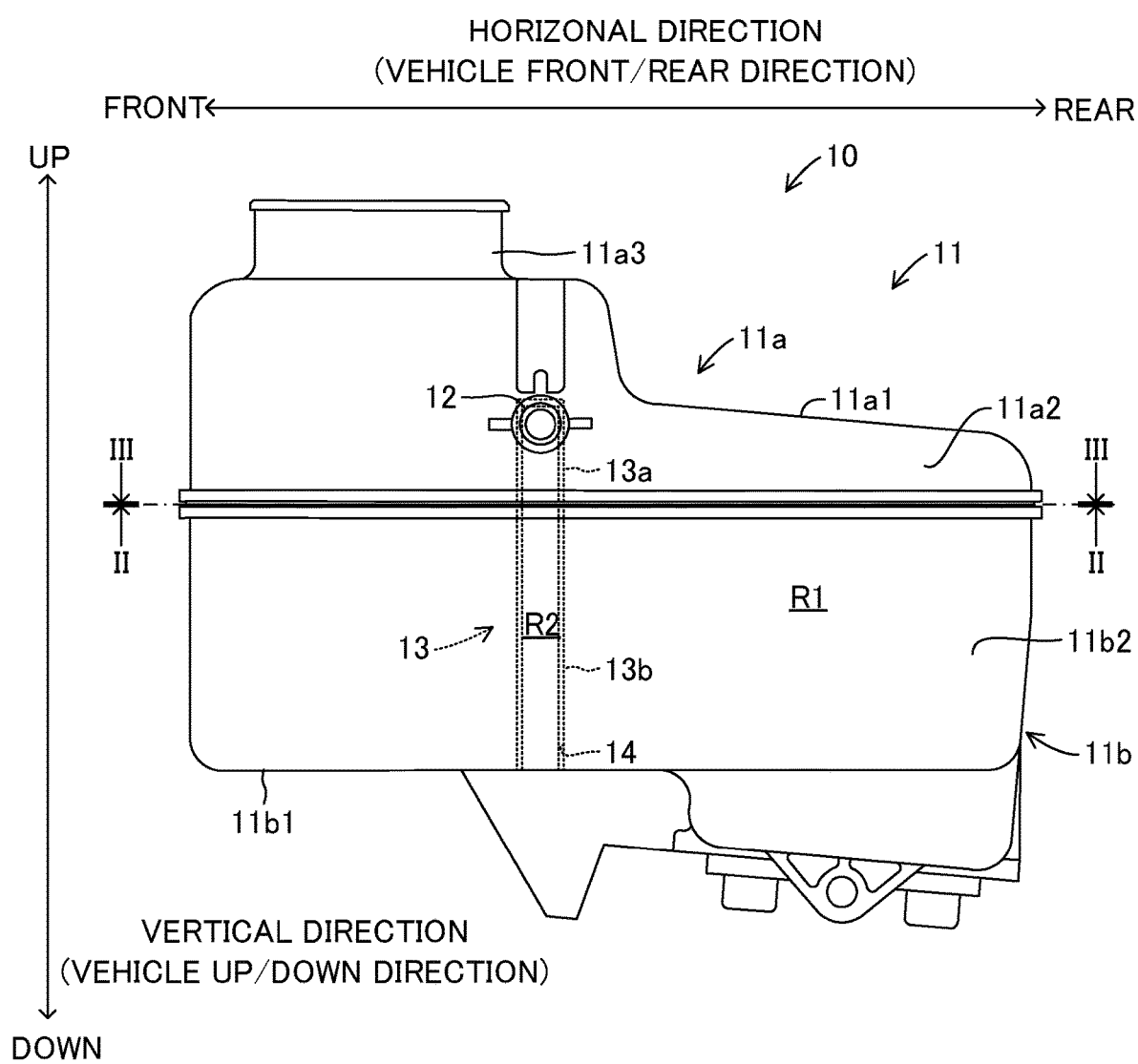
FIG. 2 is a view showing an entire structure of the reservoir tank in FIG. 1.

The reservoir tank 10 is provided with the reservoir body 11 made by a translucent resin material and formed in a hollow box shape, as shown in FIGS. 1 and 2. A reservoir chamber R1 as the first chamber and a port chamber R2 as the second chamber are formed in the inner portion of the hollow box shaped reservoir body 11, which will be explained later in detail. The reservoir body 11 according to the embodiment is divided into two portions in a vertical direction (vehicle up/down direction). Accordingly, the reservoir body 11 is formed by an upper reservoir member 11a which is the upper portion of the reservoir body 11 in a vertical direction (vehicle up/down direction) defined to be the first main body portion and a lower reservoir member 11b which is the lower portion of the reservoir body 11 in a vertical direction (vehicle up/down direction) defined to be the second main body portion. It is noted that the vehicle up/down direction agrees with the vertical direction under a state that the reservoir tank 10 is installed in the vehicle.

Figure 3:
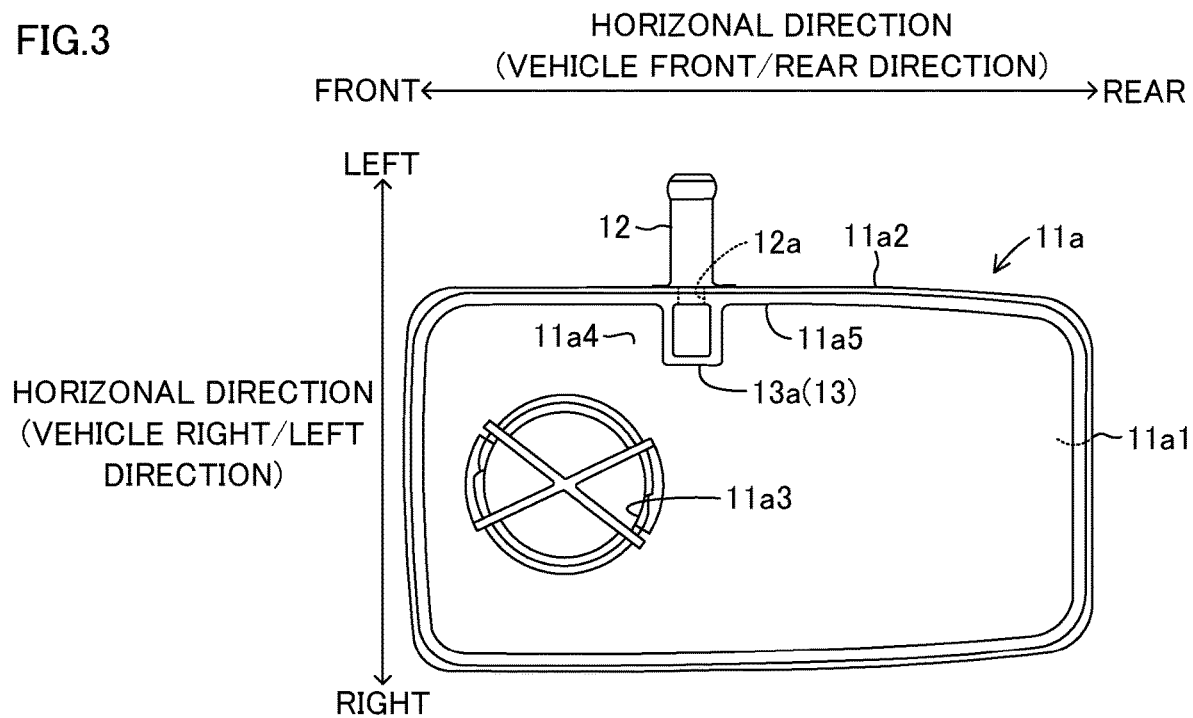
FIG. 3 is a view showing an upper reservoir member which forms the reservoir body of FIG. 2.
Figure 4:
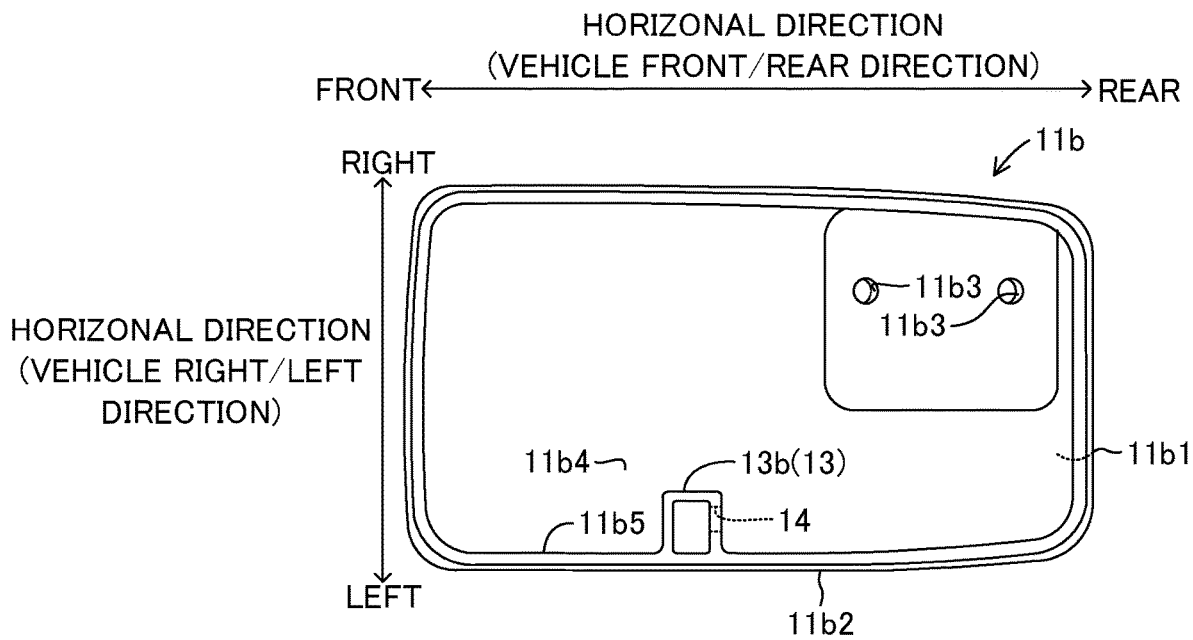
FIG. 4 is a view showing a lower reservoir member which forms the reservoir body of FIG. 2.

The upper reservoir member 11a is provided with a circumferential wall portion 11a2 projecting downward in a vertical direction at a circumferential brim end portion of the top plate 11a1 as shown in FIGS. 2 and 3. The lower reservoir member 11b is provided with a circumferential wall portion 11b2 projecting upward in a vertical direction at a circumferential brim end portion of the bottom portion 11b1, as shown in FIGS. 2 and 4. The upper reservoir member 11a and the lower reservoir member 11b are, for example, connected by heat welding to liquid-tightly seal the end portion of the circumferential wall portion 11a2 and the end portion of the circumferential wall portion 11b2 to form the reservoir body 11.

The port 12 as the tubular projecting portion projecting outwardly (in a horizontal direction and a vehicle right/left direction) to be connected to the pump 4 is provided on the circumferential wall portion 11a2 of the upper reservoir member 11a. The conduit passage 11b3 which is to be communicably connected with the master cylinder 21 is provided at the bottom portion 11b1 of the lower reservoir member 11b. In more concrete, the conduit passage 11b3 allows the fluid communication between the reservoir chamber R1 and the first master chamber 21a and the second master chamber 21b of the master cylinder 21. Thus, the reservoir body 11 (i.e., the reservoir chamber R1) is connected to the master cylinder 21 as a vehicle mounted apparatus to allow fluid communication therebetween.

The reservoir chamber R1 as the first chamber is a space for reserving the fluid which is supplied to the master cylinder 21. The port chamber R2 as the second chamber is a space in which the fluid to be supplied mainly to the pump 4 via the port 12 is filled with. The port chamber R2 has a volume smaller than the volume of the reservoir chamber R1 and is in communication with the port 12.

The fluid is poured into the reservoir chamber R1 with a predetermined amount from a tubular pouring portion 11a3 provided at the top plate 11a1 of the upper reservoir member 11a. The reservoir chamber R1 is formed with a space where the atmospheric pressure exists at an upper portion above the liquid surface in a vertical direction under the state that the predetermined amount of fluid is poured from a pouring portion 11a3. It is noted that although the illustration is omitted but a plurality of partition plates is provided in the reservoir chamber R1 to suppress the change of liquid surface level in a vertical direction caused by the movement of the reserved fluid generated upon turning movement or the braking operation of the vehicle.

The port chamber R2 according to the embodiment is separated from the reservoir chamber R1 by the first partition portion 13 as shown in FIGS. 1 and 2 with a dotted line. The first partition portion 13 is formed by an upper partition member 13a provided at the upper reservoir member 11a side and a lower partition member 13b provided at the lower reservoir member 11b side. The upper partition member 13a and the lower partition member 13b are liquid-tightly adhered to each other at the same time of heat-welding of the end portion of the circumferential wall portion 11a2 and the end portion of the circumferential wall portion 11b2, to thereby form the port chamber R2.

Figure 5:
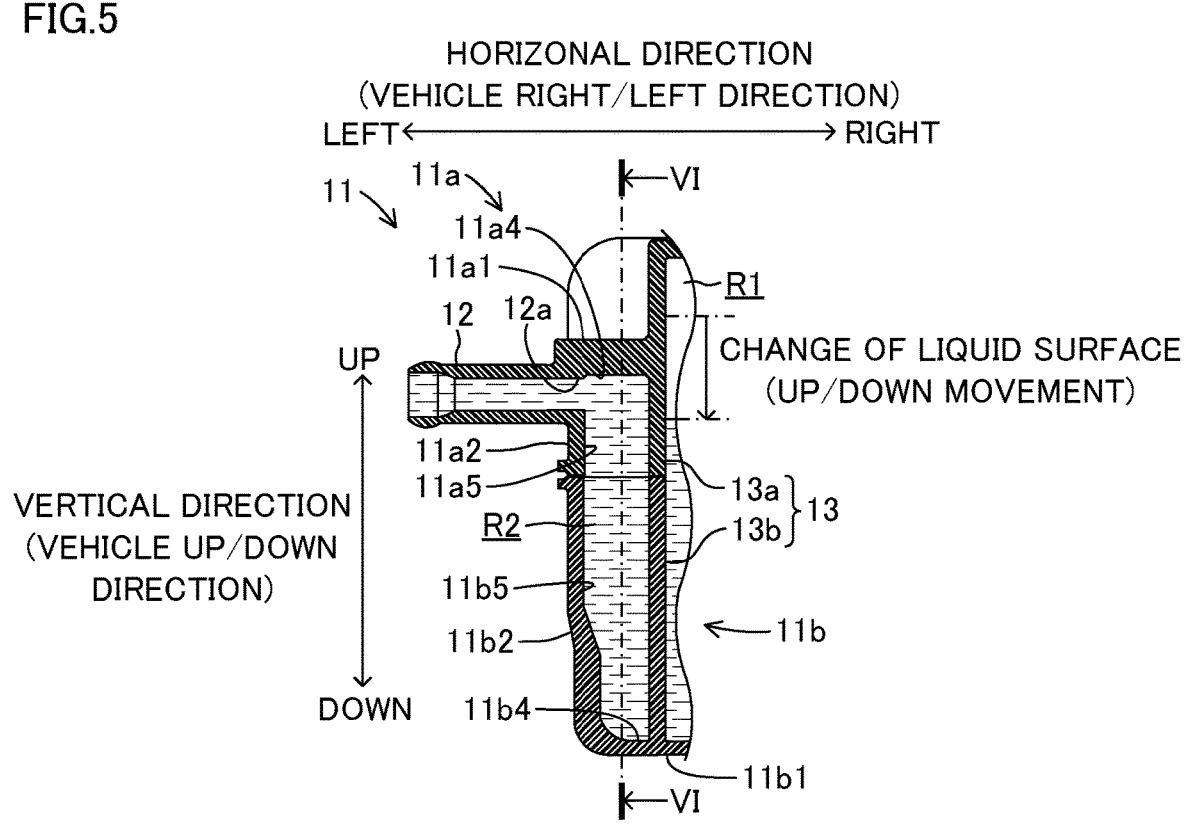
FIG. 5 is a cross section view explaining the operation of the reservoir chamber, port and port chamber.
Figure 6:
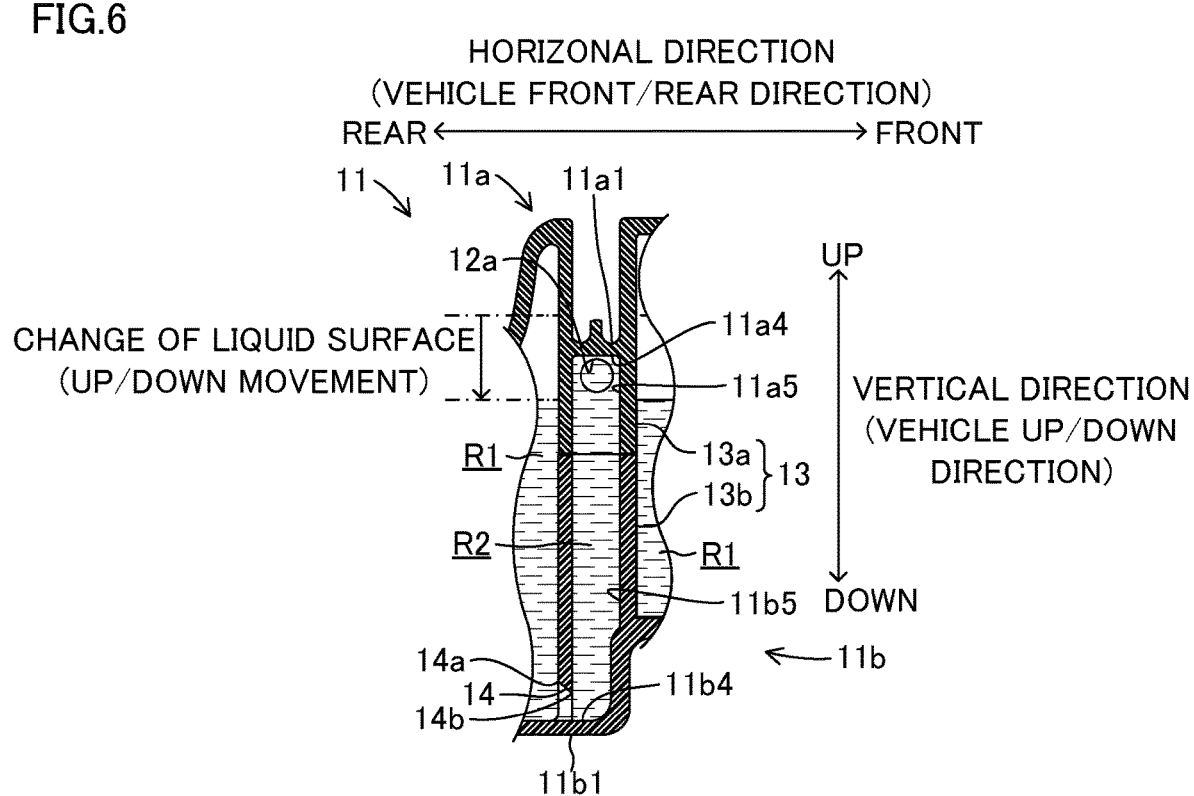
FIG. 6 is a cross section view taken along the line VI-VI of FIG. 5.

The upper partition member 13a is formed to enclose the opening 12a of the port 12 which is provided to be penetrating through the circumferential wall portion 11a2 of the upper reservoir member 11a, as shown in FIGS. 3, 5 and 6. The upper partition member 13a is provided to be extending inwardly from the inner surface 11a4 of the top plate 11a1 and the inner circumferential surface 11a5 of the circumferential wall portion 11a2. In other words, the upper partition member 13a is liquid-tightly (or integrally) connected to the inner surface 11a4 and the inner circumferential surface 11a5. Further, the size (length) of the space in a horizontal direction (vehicle front/rearward direction in FIG. 2) formed by the upper partition member 13a is set to be slightly larger than the diameter of the opening 12a of the port 12.

The lower partition member 13b is formed at the lower reservoir member 11b to be adhesive (connectable) with the upper partition member 13a provided at the upper reservoir member 11a, as shown in FIGS. 4, 5 and 6. The lower partition member 13b is provided to be extending inwardly from the inner surface 11b4 of the bottom portion 11b1 and the inner circumferential surface 11b5 of the circumferential wall portion 11b2. In other words, the lower partition member 13b is liquid-tightly (or integrally) connected to the inner surface 11b4 and the inner circumferential surface 11b5. Thus, the upper partition member 13a and the lower partition member 13b are formed and the upper partition member 13a and the lower partition member 13b are liquid-tightly connected to thereby form the port chamber R2. The longitudinal side of the port chamber R2 corresponds to a vertical direction.

Further, the first communication passage 14 is formed at the lower side of the lower partition member 13b in a vertical direction as shown in FIG. 6. The first communication passage 14 establishes fluid communication between the reservoir chamber R1 and the port chamber R2 and is formed to penetrate through the lower partition member 13b to be in contact with the inner surface 11b4 of the bottom portion 11b1 of the lower reservoir member 11b. According to this structure, even when the liquid surface of the fluid reserved in the reservoir chamber R1 is changed in a vertical direction (vehicle up/down direction) due to the vehicle turning operation or the braking operation, the first communication passage 14 is always positioned below the liquid surface of the fluid in a vertical direction.

Further, as shown in FIG. 6, the opening area (or the diameter of the opening) of the opening 14a of the first communication passage 14 at the reservoir chamber R1 side is set to be larger than the opening area (or the diameter of the opening) of the opening 14b thereof at the port chamber R2 side. In other words, the first communication passage 14 is formed such that the cross-sectional shape thereof in the vertical direction becomes approximately in a wedge shape towards the port chamber R2 side from the reservoir chamber R1 side. Thus, upon forming the first communication passage 14, the die-cutting of the mold member (such as, pin molding) can be easily made and at the same time the durability thereof can be ensured.

It is noted here that the opening area (or the diameter of the opening) of the opening 12a of the port 12 at the port chamber R2 side is set to be larger than the opening area (or the diameter of the opening) of the opening 14b of the first communication passage 14 at the port chamber R2 side. Thus, upon suctioning the fluid filled in the port chamber R2 via the port 12 by the pump 4, necessary and sufficient amount of fluid is supplied to the pump 4 via the opening 12a of the port 12 at the port chamber R2 side. On the other hand, upon stopping of suctioning fluid by the pump 4, the fluid in the port chamber R2 is prevented from flowing into (being discharged to) the reservoir chamber R1 via the openings 14b and 14a of the first communication passage 14, thereby to maintain the port chamber R2 to be filled with the fluid.

The reservoir tank 10 according to the embodiment is liquid-tightly assembled to the master cylinder 21 as shown in FIG. 1. The fluid is poured into the reservoir body 11, using, for example, a well-known vacuum filling method, etc. By pouring the fluid into the reservoir body 11, the fluid is reserved in the reservoir chamber R1 with a predetermined amount, i.e., with an amount that reaches to a predetermined liquid surface level of fluid. Further, the port chamber R2 is in fluid communication with the reservoir chamber R1 via the first communication passage 14 and accordingly, when the fluid is poured into the reservoir body 11 by the vacuum filling method, as shown in FIGS. 5 and 6, the poured fluid advances and enters the port chamber R2 which is in a vacuum state from the reservoir chamber R1 via the first communication passage 14 and filled in the port 12 which is in fluid communication with the reservoir chamber R1 and the port chamber R2. Thus, the port 12 and the port chamber R2 are kept being the state that the fluid is filled therein.

The vehicle accelerates and turns during running and decelerates by the brake operation. In response to such vehicle behavior (state), the fluid reserved in the reservoir chamber R1 moves and such movement of the fluid causes an up/down movement of the liquid surface of the fluid in a vertical direction (vehicle up/down direction). However, it is noted here that the port 12 and the port chamber R2 are kept being the filled state of fluid supplied from the reservoir chamber R1 via the first communication passage 14 as shown in FIGS. 5 and 6. It is also noted that the first communication passage 14 is formed at the first partition portion 13 (in more detail, lower partition member 13b) to be always at a location below the liquid surface in a vertical direction (vehicle up/down direction), regardless of the liquid surface change in the up/down direction caused by any particular vehicle behavior as explained above. Therefore, as shown in FIGS. 5 and 6, even the liquid surface moves down from the initial position towards the lower side in a vertical direction (vehicle up/down direction), the first communication passage 14 is prevented from being located above the liquid surface which has been moved downward from the initial position. It is noted that the downward movement in a vertical direction (vehicle up/down direction) of the liquid surface in the reservoir chamber R1 is designed to occur, for example, at a position upper than the liquid surface of the fluid which has been decreased by 20% from the initial liquid surface, or the liquid surface corresponding to the one third of the width (height) of the reservoir body 11 in a vertical direction.

Accordingly, for example, under a state that the fluid is supplied to the pump 4 via the port 12 in order to stabilize the vehicle behavior (state), even the liquid surface of the fluid in the reservoir chamber R1 drops and the opening 12a of the port 12 positions above the liquid surface, the fluid in the port chamber R2 is kept being a fluid filled state. Further, even the fluid in the reservoir chamber R1 moves to generate the air bubbles in the fluid in the reservoir chamber R1, such generated air bubbles are moved upwardly in a vertical direction (vehicle up/down direction), i.e., moves towards the atmospheric pressure chamber. Thus, the air bubbles (air) generated in the reservoir chamber R1 is prevented from entering the port chamber R2 via the first communication passage 14. As a result, the air bubbles (air) are prevented from entering the port 12 which is in fluid communication with the port chamber R2. Thus, the port 12 and the port chamber R2 are always filled with the fluid and the fluid supplied to the pump 4 via the port chamber R2 and the port 12 is prevented from including the air bubbles (air) therein. As a result, the actuator 3 to which the fluid pressurized by and supplied from the pump 4 generates no operation failure caused by the biting of the air bubbles (air) by the electromagnetic valve is generated, and the pump pressure is appropriately transmitted to the respective wheel cylinders 25 through 28.

It is noted here that generally, some air exists in the fluid and accordingly, when the fluid temperature increases or the fluid shakes (vibrates), the air dissolved in the fluid becomes an air bubble and comes out of the fluid. However, according to the embodiment, the volume (inner space) of the port chamber R2 is divided by the first partition portion 13 and the volume thereof is set to be smaller than the volume of the reservoir chamber R1.

Therefore, even under the state that the liquid surface changes by shaking (vibration) of the fluid in the reservoir chamber R1, the fluid filled in the port chamber R2 does not easily shake (vibrate). Further, even the fluid filled in the port chamber R2 should shake or vibrate, since the fluid amount in the port chamber R2 is set to be smaller than the fluid amount in the reservoir chamber R1, the air bubbles (air) are not generated in the port chamber R2. Further, even the air bubbles are generated in the port chamber R2, the generated air bubbles gather together at the upper side in the port chamber R2 in a vertical direction (vehicle up/down direction) and the amount of air bubbles that may affect the operation of the electromagnetic valve of the actuator 3 is prevented from entering the actuator 3 via the pump 4.

It is also noted that a check valve 4a is disposed between the actuator 3 and the pump 4. The check valve 4a allows the flow of the fluid from the pump 4 to the actuator 3 but prohibits the flow of the fluid from the actuator 3 to the pump 4. Accordingly, after the operation of the pump 4 is stopped, the check valve 4a prohibits the flow of the fluid towards the reservoir tank 10, i.e., towards the port 12 and the port chamber R2 via the pump 4 from the actuator 3. Thus, the fluid in the port chamber R2 is prevented from flowing towards the reservoir chamber R1 via the first communication passage 14 to maintain the port 12 and the port chamber R2 to be the fluid filled state.

As will be understood from the above explanation, the reservoir tank 10 according to the embodiment includes a hollow box shaped reservoir body 11 in which the fluid as the operating liquid is reserved and is connected to the master cylinder 21 and the pump 4 as the vehicle mounted apparatus installed in the vehicle for fluid in-flow and out-flow communication with the master cylinder 21 and the pump 4. The reservoir body 11 includes the port 12 formed as a tubular projecting portion on the circumferential wall portion 11a2 extending outwardly therefrom. The circumferential wall portion 11a2 is connected to the circumferential wall portion 11b2 which is uprightly formed on the bottom portion 11b1 extending along in a vertical direction (vehicle up/down direction) formed as an outer circumferential portion, the first partition portion 13 (upper partition member 13a and the lower partition member 13b) which divides the inner space of the reservoir body 11 into the reservoir chamber R1 as the first chamber in which the fluid is reserved and the port chamber R2 as the second chamber which volume is smaller than the reservoir chamber R1 and is in fluid communication with the port 12 and the first communication passage 14 provided at the first partition portion 13 (lower partition member 13b) at a portion lower than the liquid surface of the fluid reserved in the reservoir chamber R1 in a vertical direction (vehicle up/down direction) which liquid surface is changeable (movable in an up/down direction) in a vertical direction (vehicle up/down direction) so as to establish fluid communication between the reservoir chamber R1 and the port chamber R2. The port chamber R2 and the port 12 are kept being a fluid filled state with the fluid supplied from the reservoir chamber R1 via the first communication passage 14.

According to this structure, the inner space of the reservoir body 11 is divided into the reservoir chamber R1 and the port chamber R2 which volume is smaller than the reservoir chamber R1 and the port chamber R2 is kept being a fluid filled state with the operating liquid supplied via the first communication passage provided at a position lower than the fluid surface of the operating liquid reserved in the reservoir chamber R1 in a vertical direction (vehicle up/down direction).

According to this structure, even the operating liquid in the reservoir chamber R1 shakes (vibrates) to generate a change of the liquid surface of the operating liquid in the reservoir chamber R1, the volume of the port chamber R2 is formed to be smaller than that of the reservoir chamber R1 and is kept being a fluid filled state. Thus, the vibration of the operating liquid in the port chamber R2 can be suppressed and accordingly, the generation of air bubbles caused by the vibration of the operating liquid in the port chamber R2 can be suppressed. Further, even the air bubbles are generated in the operating liquid in the reservoir chamber R1, such generated air bubbles move upward in a vertical direction (vehicle up/down direction) and the first communication passage 14 which is provided at a lower position in a vertical direction (vehicle up/down direction) so that the entering of the air bubbles in the port chamber R2 via the first communication passage 14 can be prevented. Accordingly, by establishing the fluid communication between the port 12 and the port chamber R2, the entering of the air bubbles in the port 12 can be suppressed regardless of the position of the port 12. Therefore, the fluid to be supplied to the pump 4 and the actuator 3 (electromagnetic valve) which are the vehicle mounted apparatuses through the port 12 can be prevented from inclusion of air bubbles.

In such case, the port 12 is provided at a portion upper than the location of the first communication passage 14 in a vertical direction (vehicle up/down direction). More specifically, the reservoir body 11 is formed by the upper reservoir member 11a which is the first main body portion positioned at an upper side in a vertical direction (vehicle up/down direction) and the lower reservoir member 11b which is the second main body portion positioned at a lower side in a vertical direction (vehicle up/down direction). The port 12 is formed at the upper reservoir member 11a side and the first communication passage 14 is formed at the lower reservoir member 11b side.

According to the above structure, the first communication passage 14 always allows the fluid communication between the reservoir chamber R1 and the port chamber R2 at a lower portion in a vertical direction (vehicle up/down direction) lower than the liquid surface of the fluid reserved in the reservoir chamber R1. Thus, the port chamber R2 is kept being a state that the port chamber R2 is filled with the fluid. Accordingly, the port 12 can be freely arranged at an upper portion in a vertical direction (vehicle up/down direction) higher than the position of the first communication passage 14, regardless of the vertical change of liquid surface in the reservoir chamber R1. Accordingly, the port 12 can be provided at any position where the interference with the master cylinder 21 to which the reservoir tank 10 is assembled is avoided. This can extremely highly improve the installability (degree of freedom) of the reservoir tank 10 to the vehicle side. Further, the port 12 can be provided in both vertical direction (vehicle up/down direction) and horizontal direction (vehicle front/rear direction and vehicle right/left direction) and therefore the flow direction of the fluid passing through the port 12 can be freely (randomly) changeable.

Further, in these cases, the opening area (opening diameter) of the opening 14a of the first communication passage 14 at the reservoir chamber R1 side is set to be greater than the opening area (opening diameter) of the opening 14b of the first communication passage 14 at the port chamber R2 side.

According to such structure, upon forming the first communication passage 14, die-cutting can be easily made (i.e., the first communication passage 14 can be easily formed), by moving the mold member (such as, pin member etc.), by which the first communication passage 14 is formed, from the port chamber R2 side to the reservoir chamber R1 side. Further, the mold member (such as pin member, etc.) can be avoided to be an under-cut relative to the first communication passage 14. Thus, the durability of the mold member (such as, pin member etc.) can be improved. Further, by easily forming the first communication passage 14 as explained, the lower partition member 13b and the first communication passage 14 can be formed as a unit relative to the lower reservoir member 11b and this can decrease the number of components which are to be assembled separately to the reservoir body 11. As a result, the assembling workability of the reservoir tank 10 can be greatly improved.

Further, the opening area (opening diameter) of the opening 12a of the port 12 at the port chamber R2 side is set to be greater than the opening area (opening diameter) of the opening 14b of the first communication passage 14 at the port chamber R2 side.

According to this structure, when the pump 4 suctions the fluid filled in the port chamber R2 via the port 12, the necessary amount of fluid for suction operation of the pump 4 is supplied thereto via the opening 12a of the port 12 at the port chamber R2 side. On the other hand, when the pump 4 stops suctioning of the fluid, the fluid in the port chamber R2 is prevented from flowing (draining) to the reservoir chamber R1 via the openings 14b and 14a of the first communication passage 14 due to the orifice effect. As a result, the port chamber R2 is well kept being the fluid filled state.

Modified Embodiment

According to the embodiment explained above, the port 12 is provided at the upper reservoir member 11a of the reservoir body 11 and the first communication passage 14 is provided at the lower reservoir member 11b of the reservoir body 11. Further, the port chamber R2 is formed such that the first partition portion 13, i.e., portion formed by the upper partition member 13a and the lower partition member 13b positions in a longitudinal side in a vertical direction (vehicle up/down direction) in order to connect the first communication passage 14 and the port 12 which are mutually separated in a vertical direction (vehicle up/down direction) under the state that the fluid in the port chamber R2 is kept being filled. It is noted here that the arrangement of the port 12 in the reservoir tank 10 is not specifically limited and therefore, it can be possible to provide the port 12, the first communication passage 14 and the port chamber R2 at the lower reservoir member 11b. Such arrangement will be explained hereinafter as the modified embodiment.

Figure 7:
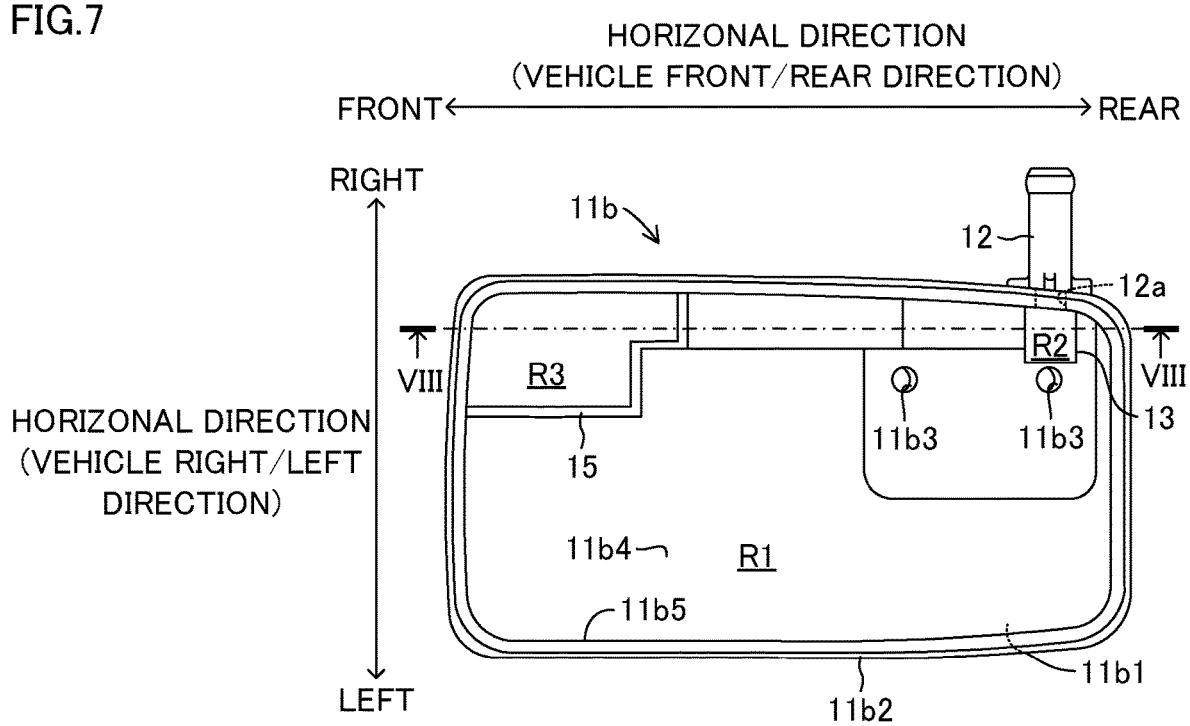
FIG. 7 is a lower reservoir member which forms the reservoir body associated with a modified embodiment of the invention.
Figure 8:
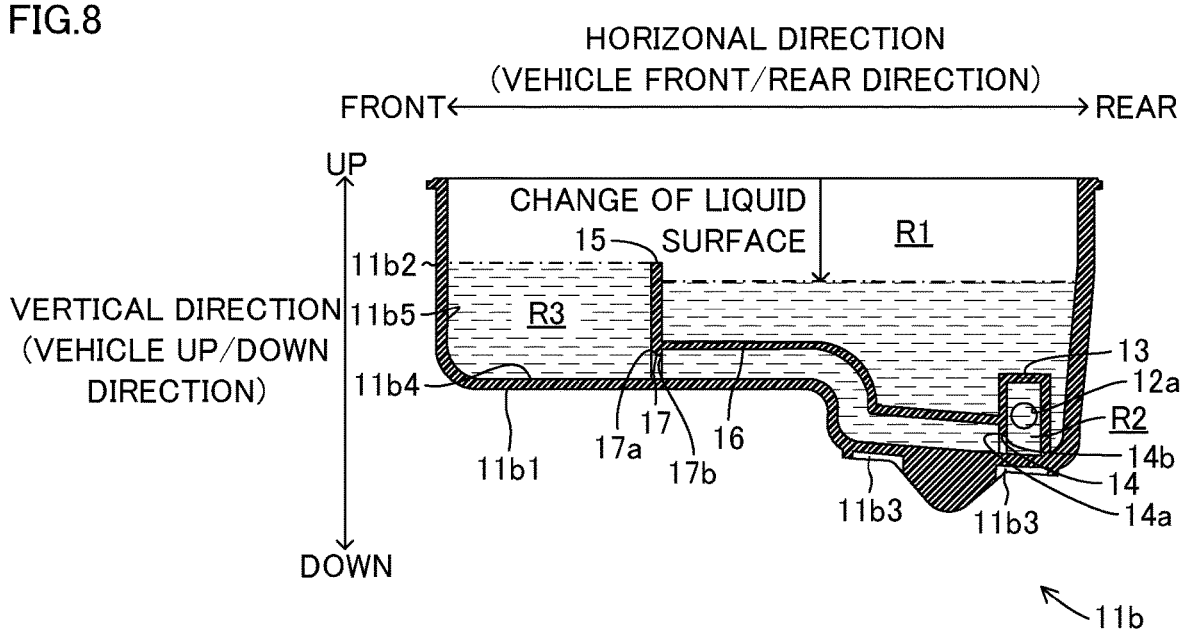
FIG. 8 is a cross sectional view taken along the line VIII-VIII in FIG. 7 and explaining the operation of an exclusive use chamber, a fluid passage and a second communication passage.

In the modified embodiment, as shown in FIGS. 7 and 8, the port 12, the port chamber R2 and the first communication passage 14 are provided in the vicinity of the conduit passage 11b3 relative to the lower reservoir member 11b. In this modified embodiment, as the third chamber, an exclusive use chamber R3 defined in the reservoir chamber R1 and a fluid passage 16 are provided at the lower reservoir member 11b at an any arbitrary portion thereof for supplying the port chamber R2 with the fluid. Thus, even the case where it is difficult to provide a sufficiently large exclusive use chamber R3 around the port 12, the designing which is necessary for keeping the state of the port chamber R2 being a fluid filled state can be obtained with a degree of designing freedom.

The exclusive use chamber R3 is defined in the interior of the reservoir chamber R1 at the position separated from the port chamber R2 in a horizontal direction (vehicle front/rear direction) by the second partition portion 15. The second partition portion 15 is provided extending inwardly from the inner surface 11b4 of the bottom portion 11b1 and the inner circumferential surface 11b5 of the circumferential wall portion 11b2 of the lower reservoir member 11b. In other words, the second partition portion 15 is in liquid-tightly (integrally) connected to the inner surface 11b4 and the inner circumferential surface 11b5. It is noted here that the height of the second partition portion 15 in a vertical direction is set depending on the amount of fluid to be supplied to the pump 4 regardless of the change of the liquid surface of the fluid reserved in the reservoir chamber R1.

The fluid passage 16 is connected to the first partition portion 13 which forms the port chamber R2 at one end and is connected to the second partition portion 15 which forms the exclusive use chamber R3 at the other end thereof. Thus, the fluid passage 16 extends along in the vehicle front/rear direction at both of the inner surface 11b4 of the bottom portion 11b1 and the inner circumferential surface 11b5 of the circumferential wall portion 11b2 of the lower reservoir member 11b.

The other end of the fluid passage 16, i.e., the lower portion of the second partition portion 15 in a vertical direction is formed with a second communication passage 17 which connects the exclusive use chamber R3 and the fluid passage 16 (accordingly, the port chamber R2 via the first communication passage 14) as shown in FIG. 8. The second communication passage 17 is formed to be in contact with the inner surface 11b4 of the bottom portion 11b1 of the lower reservoir member 11b and penetrates through the second partition portion 15. Thus, even when the liquid surface of the fluid reserved in the reservoir chamber R1 changes in a vertical direction (vehicle up/down direction) due to a turning operation or a braking operation of the vehicle, the second communication passage 17 is always positioned at the lower portion in a vertical direction relative to the liquid surface of the fluid reserved in the exclusive use chamber R3.

Further, as like the first communication passage 14, the opening area (opening diameter) of the opening 17a of the second communication passage 17 at the exclusive use chamber R3 side is set to be greater than the opening area (opening diameter) of the opening 17b of the second communication passage 17 at the fluid passage 16 side. In other words, the cross-sectional shape of the second communication passage 17 along in a vertical direction is formed to be approximately in a wedge shape towards the fluid passage 16 side from the exclusive use chamber R3 side. Thus, upon forming the reservoir body 11, the forming of the second communication passage 17 by the mold member (such as, pin molding) can be easily made (for example, die-cutting of the) and at the same time the durability of the mold member can be ensured.

It is noted that in this modified embodiment, for example, the lower reservoir member 11b is divided into two portions by a plane including the vertical direction (vehicle up/down direction) and the vehicle front/rear direction, and the half-divided first partition portion 13, the first communication passage 14, the second partition portion 15, the fluid passage 16 and the second communication passage 17 can be adhered to one another by heat-welding or the like to form the lower reservoir member. Further, although the number of components increases, it is possible to adhere separately formed and prepared first partition portion 13, the first communication passage 14, the second partition portion 15, the fluid passage 16 and the second communication passage 17 to the bottom portion 11b1 of the lower reservoir member 11b by heat welding etc.

According to the reservoir tank 10 associated with the structure of the modified embodiment, the reservoir body 11 includes the second partition portion 15 formed on the inner surface 11b4 of the bottom portion 11b1 of the lower reservoir member 11b and defining the exclusive use chamber R3 in the interior of the reservoir chamber R1 as the third chamber communicating with the reservoir chamber R1, the second communication passage 17 provided at the second partition portion 15 and positioned at the lower portion lower than the liquid surface of the fluid reserved in the reservoir chamber R1 in a vertical direction (vehicle up/down direction) and the fluid passage 16 which connects the first communication passage 14 and the second communication passage 17, wherein the fluid passage 16 is kept being the state filled with the fluid.

According to the reservoir tank 10 of the modified embodiment structured above, as shown in FIG. 8, for example, even the fluid amount in the reservoir chamber R1 decreases, the second communication passage 17 is always positioned at the lower portion in the vertical direction relative to the liquid surface of the fluid in the exclusive use chamber R3 defined by the second partition portion 15. Further, in this modified embodiment, the interior of the fluid passage 16 is filled with the fluid and at the same time the interior of the port chamber R2 is filled with the fluid. Accordingly, upon supplying the pump 4 with the fluid via the port 12, as similar to the embodiment, the supplied fluid does not include the air bubbles.

Even in a case where the port chamber R2 has to be disposed in a place where not sufficient volume can be secured, by connecting the first communication passage 14 (i.e., port chamber R2) and the second communication passage 17 (i.e., exclusive use chamber R3) by the fluid passage 16, the fluid without the air bubbles can be surely supplied from the exclusive use chamber R3. Accordingly, the port chamber R2, i.e., the port 12, can be freely arranged in both up/down direction and right/left direction relative to the vehicle not to interfere with other components of the vehicle. As a result, the installability of the reservoir tank 10 to the vehicle can be extremely improved.

Further, the opening area (opening diameter) of the opening 17a of the second communication passage 17 at the exclusive use chamber R3 side is set to be greater than the opening area (opening diameter) of the opening 17b at the fluid passage 16 side.

According to the structure above, as similar to the first communication passage 14 of the embodiment, by easily forming the second communication passage 17, the second partition portion 15 and the second communication passage 17 can be formed as a unit relative to the lower reservoir member 11b and this can decrease the number of components which are to be assembled separately to the reservoir body 11. As a result, the assembling workability of the reservoir tank 10 can be greatly improved.

Further, the opening area (opening diameter) of the opening 12a of the port 12 at the port chamber R2 side is set to be greater than the opening area (opening diameter) of the opening 17b of the second communication passage 17 at the fluid passage 16 side.

According to the structure, upon suctioning the fluid filled in the port chamber R2 via the port 12 by the pump 4, necessary and sufficient amount of fluid is supplied to the pump 4 via the opening 12a of the port 12 at the port chamber R2 side. On the other hand, upon stopping of suctioning fluid by the pump 4, the fluid in the port chamber R2 and the fluid passage 16 is prevented from flowing into (being discharged to) the reservoir chamber R1 via the openings 17b and 17a of the second communication passage 17, thereby to keep the port chamber R2 and the fluid passage 16 being filled with the fluid under a good state. The other effects are the same as those in the embodiment.

When implementing the invention, the invention is not limited to the embodiment and the modified embodiment explained above and various modifications and changes may be possibly made within the scope of the invention unless such are not departing from the objective of the invention.

For example, according to the embodiment and the modified embodiment, the reservoir tank 10 supplies the master cylinder 21 and the pump 4 as a vehicle mounted apparatus which forms the vehicle brake device with the fluid. However, instead of this, it is possible that the reservoir tank 10 supplies the clutch master cylinder of the transmission as a vehicle mounted apparatus with the fluid. In such case, the reservoir tank 10 is provided for supplying the clutch master cylinder with the fluid from the port 12. It may be also possible that as similar to the embodiment and the modified embodiment, the reservoir tank 10 is provided on the master cylinder 21 and the fluid is supplied to the clutch master cylinder via the port 12 of the reservoir tank 10. As explained, in a case where the fluid is supplied to the clutch master cylinder from the port 12, as similar to the embodiment and the modified embodiment, the port 12 supplies the clutch master cylinder with the fluid from the fluid filled port chamber R2.

Accordingly, in such case also the generation of air bubbles in the fluid supplied to the clutch master cylinder from the reservoir tank 10 can be suppressed. Further, since the position of the port 12 can be changeable according to the arrangement of the clutch master cylinder, the degree of freedom of designing the reservoir tank 10 can be highly raised and at the same time the installability of the reservoir tank 10 to the vehicle can be improved.

Further, according to the embodiment, the longitudinal side of the port chamber R2 is arranged to be positioned in a vertical direction (vehicle up/down direction). However, it is possible to arrange the longitudinal side of the port chamber R2 to be positioned in a horizontal direction (vehicle right/left direction) or it may also be possible to arrange the longitudinal side of the port chamber R2 to have an angle relative to the vertical direction (vehicle up/down direction) and the horizontal direction (vehicle right/left direction, vehicle front/rear direction).

Further, according to the embodiment and the modified embodiment, the port chamber R2 is formed by using the inner circumferential surface 11a5 of the circumferential wall portion 11a2 and inner circumferential surface 11b5 of the circumferential wall portion 11b2. In other words, the port chamber R2 is formed to be in contact with the inner circumferential surface 11a5 and the inner circumferential surface 11b5. However, instead of this structure, it is possible to form the port chamber R2 by dividing the reservoir chamber R1 liquid-tightly by the first partition portion 13 so that the port chamber R2 is separated from the inner circumferential surface 11a5 and the inner circumferential surface 11b5. In such case, depending on the position of the port 12, the port chamber R1 is formed by the first partition portion 13, by, for example, fixing the port chamber R2 to the top plate 11a1 or to the partition plate or rib provided on the reservoir chamber R1. Such alternative forming of the port chamber r1 can also be expected to exert the advantageous effect of the embodiment and the modified embodiment.

Further, according to the embodiment and the modified embodiment, the first communication passage 14 is formed to penetrate through the lower partition member 13b to be in contact with the inner surface 11b4 of the bottom portion 11b1 of the lower reservoir member 11b. However, instead of this structure, a groove is provided on the bottom portion 11b1 of the lower reservoir member 11b along the end surface of the lower partition member 13b and it is possible to form the first communication passage 14 by such groove on the bottom portion 11b1 and the end surface of the lower partition member 13b.

Further, according to the embodiment and the modified embodiment, the port 12 serves to supply the pump 4 with the fluid from the reservoir tank 10. However, instead of such structure, it is possible to form the port 12 to have the fluid return from the actuator 3 to the reservoir tank 10. As explained, even the alternative structures explained above, since the port chamber R2 is filled with the fluid, the flow of the fluid is not interrupted by the air bubbles and as a result, an extremely smooth returning of the fluid into the reservoir tank 10 can be achieved.

BRIEF EXPLANATION OF SYMBOLS AND NUMERALS

1: brake device, 2: cylinder mechanism, 3: brake actuator, 4: pump (vehicle mounted apparatus), 4a: check valve, 10: reservoir tank, 11: reservoir body, 11a: upper reservoir member, 11a1: top plate, 11a2: circumferential wall portion, 11a3: pouring portion, 11a4: inner surface, 11a5: inner circumferential surface, 11b: lower reservoir member, 11b1: bottom portion, 11b2: circumferential wall portion, 11b3: conduit passage, 11b4: inner surface, 11b5: inner circumferential surface, 12: port (tubular projecting portion), 12a: opening, 13: first partition portion, 13a: upper partition member, 13b: lower partition member, 14: first communication passage, 14a: opening, 14b: opening, 15: second partition portion, 16: conduit passage, 17: second communication passage, 17a: opening, 17b: opening, 21: brake master cylinder (vehicle mounted apparatus), 21a: first master chamber, 21b: second master chamber, 22, 23: master piston, 24: brake booster, 25 through 28: wheel cylinder, 29: brake pedal, R1: reservoir chamber (first chamber), R2: port chamber (second chamber), R3: exclusive use chamber (third chamber), FL: front left wheel, FR: front right wheel, RL: rear left wheel, RR: rear right wheel.

The invention claimed is:

1. A reservoir tank comprising a reservoir body which reserves an operating liquid in an inner portion thereof formed to be in a hollow box shape, the reservoir tank being connected to a vehicle mounted apparatus for a fluid communication of the operating liquid with the vehicle mounted apparatus, wherein the reservoir body includes:
a tubular projecting portion extending outward from an outer wall portion;
a first partition portion which divides the inner portion of the reservoir body into a first chamber which reserves the operating liquid therein and a second chamber which volume is smaller than the volume of the first chamber and being in communication with the tubular projecting portion; and
a first communication passage positioned at a portion lower than a vertically changeable liquid surface of the operating liquid reserved in the first chamber in a vertical direction and provided at the first partition portion to allow a communication between the first chamber and the second chamber,
and wherein,
the second chamber and the tubular projecting portion are kept being a state in which the first chamber and the second chamber are filled with the operating liquid which is supplied thereto from the first chamber via the first communication passage, and
an opening area of the first communication passage at a first chamber side is set to be larger than an opening area of the first communication passage at a second chamber side.

2. The reservoir tank according to claim 1, wherein the tubular projecting portion is provided at an upper portion higher than a position of the first communication passage in the vertical direction.

3. The reservoir tank according to claim 2, wherein
in the horizontal direction, the first chamber is adjacent to the second chamber, and
in the horizontal direction, the opening area of the first communication passage at the first chamber side is set to be larger than the opening area of the first communication passage at the second chamber side.

4. The reservoir tank according to claim 1, wherein
the reservoir body is formed by a first main body portion which is located at an upper side in the vertical direction and a second main body portion which is located at a lower side in the vertical direction relative to the first main body portion and wherein
the tubular projecting portion is provided at a first main body side and the first communication passage is provided at a second main body side.

5. The reservoir tank according to claim 1, wherein an opening area of the tubular projecting portion at a second chamber side is set to be larger than the opening area of the first communication passage at the second chamber side.

6. A reservoir tank comprising a reservoir body which reserves an operating liquid in an inner portion thereof formed to be in a hollow box shape, the reservoir tank being connected to a vehicle mounted apparatus for a fluid communication of the operating liquid with the vehicle mounted apparatus, wherein
the reservoir body includes:
a tubular projecting portion extending outward from an outer wall portion;
a first partition portion which divides the inner portion of the reservoir body into a first chamber which reserves the operating liquid therein and a second chamber which volume is smaller than the volume of the first chamber and being in communication with the tubular projecting portion;
a first communication passage positioned at a portion lower than a vertically changeable liquid surface of the operating liquid reserved in the first chamber in a vertical direction and provided at the first partition portion to allow a communication between the first chamber and the second chamber;
a second partition portion which defines a third chamber in an inner portion of the first chamber, the third chamber being extending from an inner surface of a bottom portion of the first chamber and being in communication with the first chamber;
a second communication passage positioned at a portion lower than the vertically changeable liquid surface of the operating liquid reserved in the first chamber in the vertical direction and provided at the second partition portion; and
a fluid passage which connects the first communication passage and the second communication passage, and wherein
the second chamber and the tubular projecting portion are kept being a state in which the first chamber and the second chamber are filled with the operating liquid which is supplied thereto from the first chamber via the first communication passage, and
the fluid passage is kept being a state filled with the operating liquid.

* * * * *